Figure 1:
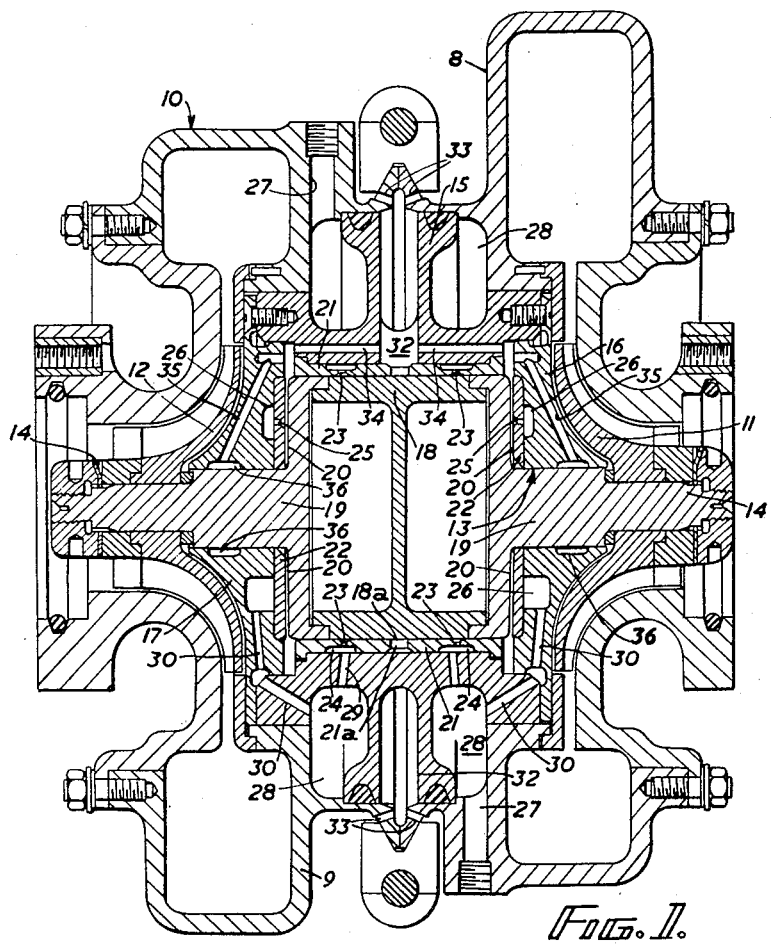

Dec. 16, 1958 N. ANDERSON 2,864,552
SHAFT OR LIKE BEARINGS
Filed Aug. 18, 1954 4 Sheets-Sheet 1

INVENTOR
NORMAN ANDERSON
BY Young, Emery &
Thompson
ATTORNEYS

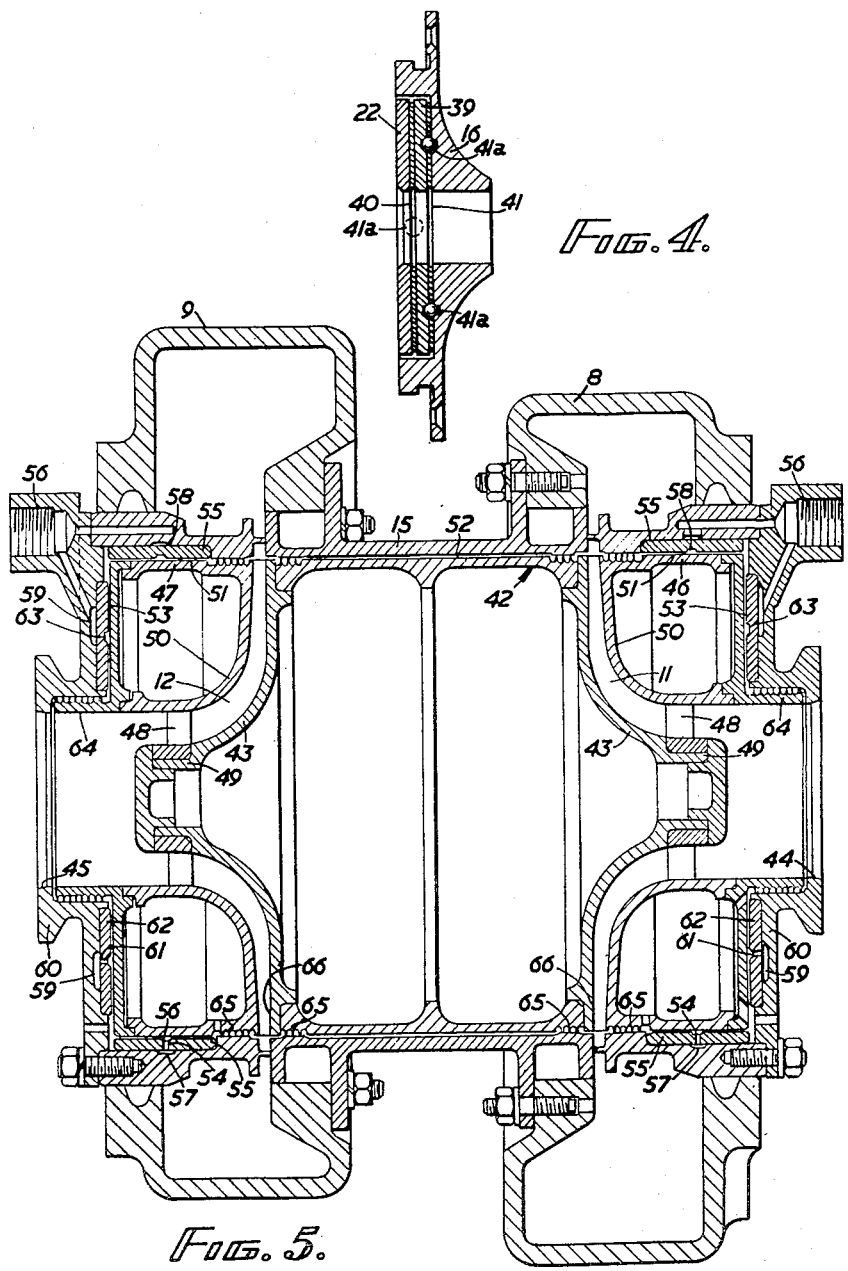

INVENTOR
NORMAN ANDERSON
BY Young, Emery
& Thompson
ATTORNEYS

Dec. 16, 1958  N. ANDERSON  2,864,552
SHAFT OR LIKE BEARINGS
Filed Aug. 18, 1954  4 Sheets-Sheet 4

INVENTOR
NORMAN ANDERSON
BY Young, Emery & Thompson
ATTORNEYS

United States Patent Office 2,864,552
Patented Dec. 16, 1958

2,864,552

SHAFT OR LIKE BEARINGS

Norman Anderson, Hanworth, England, assignor, by mesne assignments, to Sir George Godfrey & Partners (Holdings) Limited, Hanworth, England Application August 18, 1954, Serial No. 450,747

11 Claims. (Cl. 230—116)

This invention relates to the bearings of shafts or other rotors, herein termed "shaft or like bearings," particularly the bearings of shafts or the like required to run at high speed and high temperature. As an example of machines running under these conditions may be mentioned high speed braked turbines comprising free-running coupled centrifugal air compressor and turbine units which are utilised, sometimes with an interposed cooler for the throughput air, to enable cooling of pressure air on the reversed heat cycle principle for the provision of a supply of cooled air for the pressure cabins of high altitude aircraft. Such units must necessarily be of small size while yet being able to deal with large air flows and they accordingly operate at shaft speeds between 50,000 and 100,000 R. P. M. Similar, although less arduous, conditions may arise in high speed grinding spindles.

The main object of the invention is to provide shaft or like bearing arrangements which will be suitable to withstand extremely high surface speeds and high temperatures and which will moreover operate efficiently throughout the range from very high to low, for example sub-zero, temperatures and high speeds. Another object is to provide bearing arrangements which are inexpensive both in first cost and maintenance as compared with bearings hitherto devised for conditions not nearly as arduous as those which the present bearings are required to satisfy.

According to the invention a shaft or like bearing comprises axially spaced bearing portions extending in a radial sense with respect to the axis of rotation of the shaft or the like, a further bearing portion of substantially cylindrical form coaxial with said axis of rotation and disposed between such spaced bearing portions, and means for feeding a gaseous fluid medium between said spaced bearing portions and further bearing portion and the corresponding bearing surfaces of the shaft or the like, which lie closely adjacent to such spaced bearing portions and further bearing portion, in order to provide gas-charged radial and end thrust bearings for the shaft or the like.

By reason of the foregoing arrangement cylindrical and annular end "gas bearing films or cushions" are formed which centralise the shaft or the like, or an enlarged part of the latter, and axially locate it so that the use of liquid lubricant may be entirely dispensed with.

The bearing portion of cylindrical form preferably expends throughout the length between the spaced bearing portions whereby a substantially continuous gaseous bearing layer or envelope enclosing the spaced radial bearing surfaces and intervening bearing surface of the shaft or the like is formed. If desired the gaseous fluid medium may be supplied from an external source of pressure gas or the pressure may be induced as a result of the rotation of the machine of which the shaft or the like forms a part. This self-induction of the pressure gas for charging the bearing is of particular advantage when air is employed as the gaseous fluid medium inasmuch as the air may be taken from the ambient atmosphere and supplied to the aforesaid bearing portions by reason of the rotation of the machine.

When the machine of which the shaft or the like forms a part itself handles air or other gaseous fluid, means are preferably provided for avoiding mixing of the throughput fluid with the gas charging the bearing and vice versa. Such means preferably comprise arrangements for venting the bearing-charging gas to atmosphere in such manner that throughput fluid is prevented from reaching the bearing-charging gas spaces and interfering with the balance of pressures necessary for successful operation of the bearing. For example, in the case of a braked turbine comprising a free-running coupled centrifugal air compressor and turbine, vent spaces may be formed around the common rotor shaft at points immediately inward of the compressor and turbine rotors to which spaces bearing-charging gas is fed in order to prevent throughput air passing from either the compressor or the turbine rotor along the shaft and interfering with the gas bearing arrangements.

If desired the aforesaid bearing portions may comprise cylindrical and end bearing elements of carbon or molybdenum disulphide-treated steel in order to prevent damage to the bearing when starting from static conditions or during the stopping period of the machine. When the pressure gas with which the bearing is charged is induced by the rotation of the machine itself chromium plated steel bearing elements may be employed instead of those of carbon or molybdenum disulphide-treated steel.

In order to secure substantially even pressure distribution of the bearing-charging gas over the total areas of the spaced bearing portions and intervening cylindrical bearing portion, each of such portions is preferably provided with a multiplicity of feed holes disposed in equi-angularly spaced relationship with respect to the axis of rotation of the shaft or the like, to which feed holes the bearing-charging gas is continuously supplied.

Figure 3:
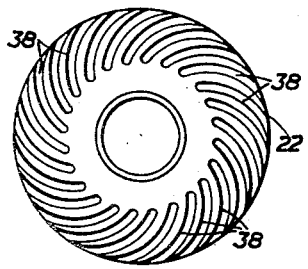
Figure 2:
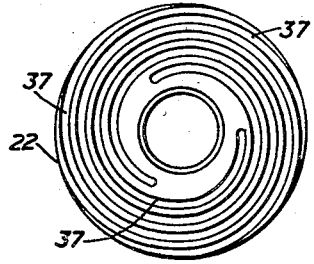
Figure 6:
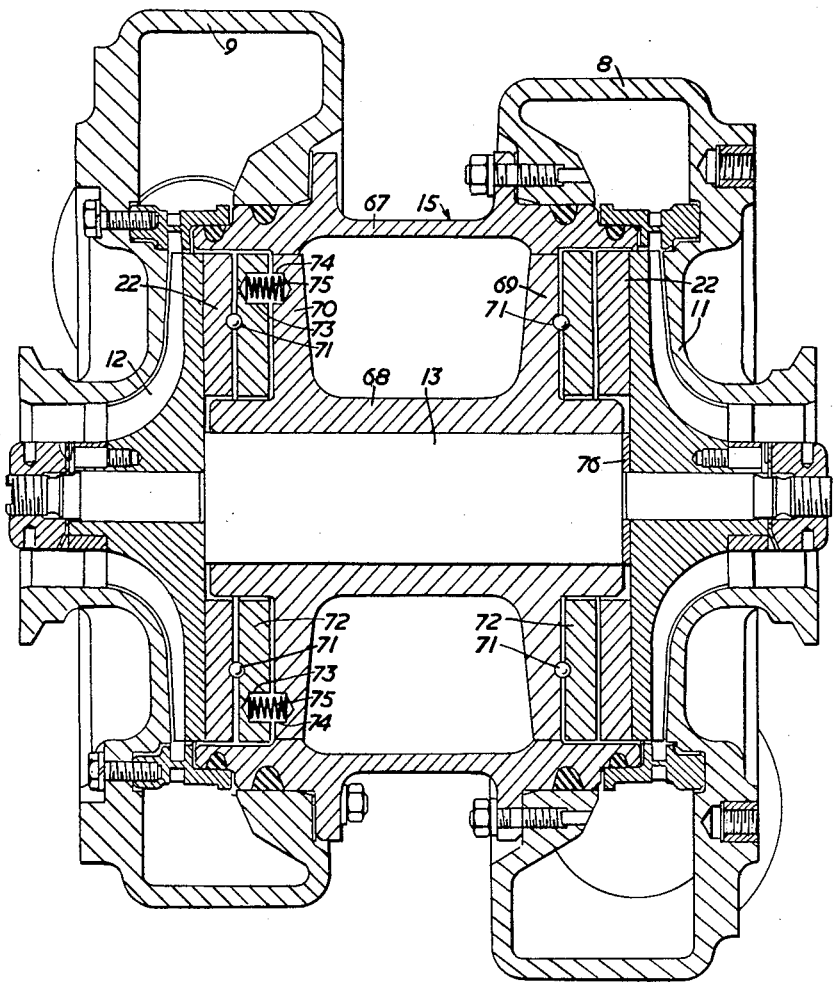
Figure 7:
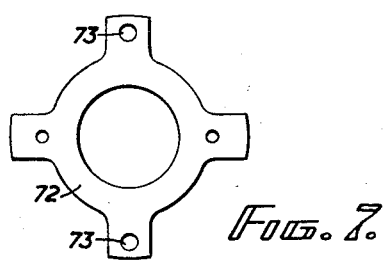
Figure 8:
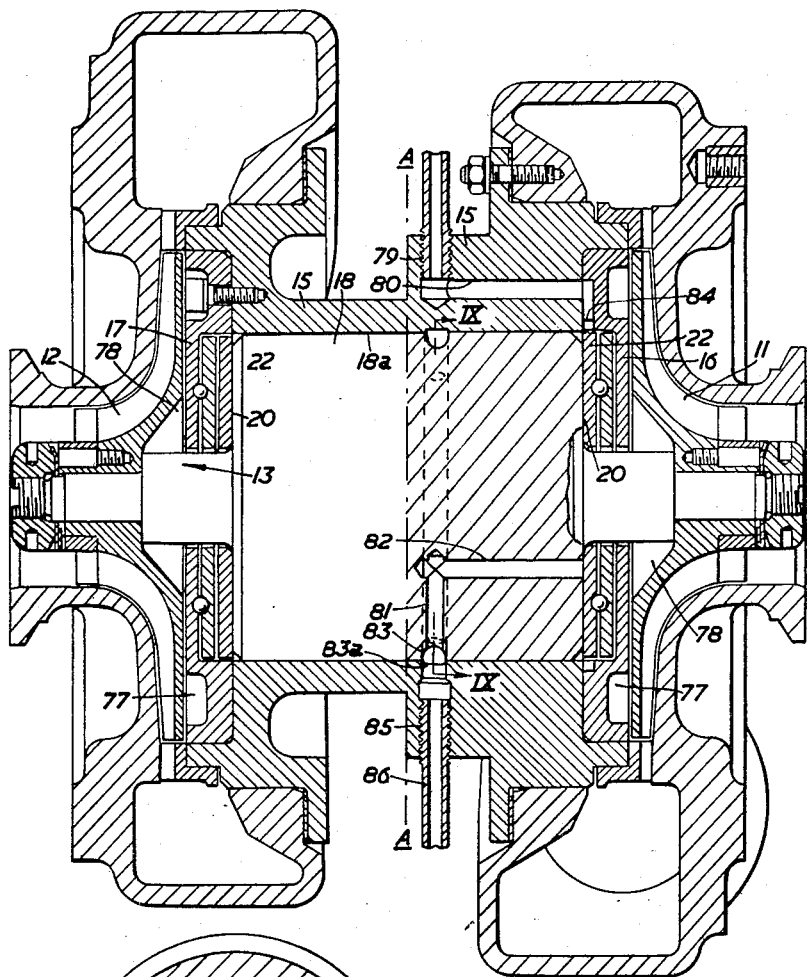
Figure 9:
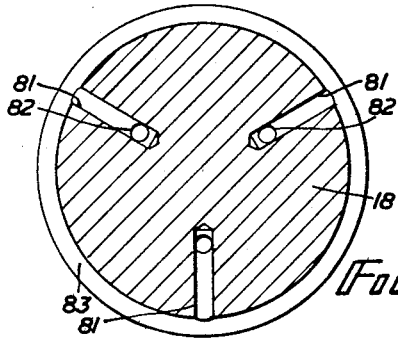

The application of the invention to several forms of free-running air compressor and expander units for the supply of cooled air to the sealed cabin of an aircraft will now be described, by way of example, with reference to the accompanying drawings, in which:

Figure 1 is an axial section of an air compressor and expander unit in which the centre portion of the shaft carrying the compressor and turbine rotors is enlarged, Figures 2 and 3 illustrate alternative forms of end plates which may be embodied in the machine shown in Figure 1 to automatically induce pressure air to the bearing, Figure 4 is a sectional view of a self-aligning end or thrust plate assembly, Figure 5 illustrates a machine in which the compressor and turbine rotors and the central portion of the shaft are of equal diameter, Figure 6 shows an alternative embodiment in which a shaft of constant section and of small diameter relatively to the compressor and turbine rotors is employed, Figure 7 shows a spider forming part of the self-aligning end plate assembly of the machine shown in Figure 6, Figure 8 is a divided axial section of a further embodiment, the left half of the figure showing the bearings fed with pressure air induced by the rotation of the shaft and the right half of the figure the machine adapted for pressure-fed air, and Figure 9 is a sectional view of the shaft on the line IX—IX of Figure 8.

Referring to Figure 1 of the drawings, the air compressor and expander unit 10 comprises a centrifugal compressor and inward flow turbine rotor 11 and 12 respectively mounted at opposite ends of a common shaft 13 on reduced end portions 14 of such shaft, the turbine rotor receiving pressure air from a suitable source, such as the compressor of the main gas turbine engine of the aircraft or an auxiliary blower driven from such engine. From whatever source, the pressure air is expanded over the turbine rotor 12 with loss of heat, such pressure air being either fed directly from the source to the expansion turbine so that the compressor acts merely as a brake without entering into the air cycle or alternatively the compressor may receive the throughput air from the source before such air passes to the turbine whereby it is additionally compressed and then passed through a cooler, not illustrated, to extract heat therefrom whereafter it is fed to the turbine where further loss of heat occurs.

In addition to the compressor and turbine rotors 11, 12, which are arranged with their backs towards each other, the unit 10 essentially comprises a substantially cylindrical centre housing 15 arranged as an insert between the compressor and turbine volutes 8, 9 and end casings 16, 17 attached to the centre housing at the open ends of the latter. In accordance with the invention the common shaft 13 of the compressor and turbine rotors 11, 12 is made with a portion 18 of increased diameter between such rotors so that a central cylindrical bearing portion is formed which may be, for example, at least three or four times the diameter of the shaft ends or even considerably more than that, as will be referred to hereinafter. In the example illustrated the enlarged portion 18 of the shaft 13 is hollow and the shaft comprises two substantially similar solid flanged end portions 19 each secured to the hollow central portion by such flanges. By the enlargement of the central portion 18 of the shaft, bearing surfaces 20 extending in a radial sense with respect to the axis of rotation of the shaft 13 are formed at each end of the larger diameter cylindrical bearing portion 18a of the latter, such bearing surfaces being formed by the outer faces of the flanges of the end portions 19 of the shaft which constitute annular shoulders extending outwardly of, and normal to, the common axis of the end portions.

The bearing portions of the centre housing 15 and end casings 16, 17 extend closely adjacent to the cylindrical and flat annular bearing surfaces 18a, 20 of the increased diameter portion 18 of the shaft and are constituted respectively by two similar cylindrical sleeves 21, between the inner ends of which a channel 21a is left, and two flat annular bearing plates 22 arranged as inserts in the centre housing and end casings respectively. The bearing sleeves 21 and end plates 22 may be of carbon or of molybdenum disulphide-treated steel in order to afford some measure of self-lubrication to prevent damage when the machine is starting up from static conditions. The radial clearance between the increased diameter portion 18 of the shaft and its bearing sleeves 21, in the case of a 2" diameter bearing, may be, for example, between .0001" and .005" and the end clearances, i. e., the clearance between the annular end shoulders 20 of the expanded portion 18 of the shaft and the end bearing plates 22 of the end casings 16, 17 lying adjacent thereto, may be of the same order. Preferably the cylindrical and flat bearing surfaces 18a, 20 of the shaft 13 are honed and mirror-finished, the sleeves and bearing plate inserts 21, 22 of the bearing being similarly finished when these are of steel.

At axially spaced points of the bearing sleeves 21 a plurality of angularly spaced feed holes 23 are formed therethrough. In the example illustrated there are two spaced rings of feed holes, each ring being disposed substantially centrally in the respective sleeve 21 so that its distance from the end of the centre housing 15 is approximately half its distance from the other ring, the holes of each ring being equiangularly spaced with respect to the axis of the shaft 13. There are preferably six or more feed holes 23 in each ring and the outer ends of the holes of each ring are all connected by a circumferential channel 24 extending around the outer surface of each respective sleeve 21. A similar series of feed holes 25 is formed in each flat annular end bearing plate 22, the holes extending through such end plates to communicate with a ring-like feed channel 26 formed in the end casings 16, 17.

High pressure air is fed through a pipe connected to the outer end of a bore 27 radially arranged with respect to the centre housing 15 and which leads to an annular reservoir 28 associated with the centre housing and extending coaxially of the shaft 13 of the machine. From such reservoir feed channels 29, 30 for the pressure air lead to the ring channels 24, 26 in the cylindrical bearing sleeves 21 and behind the axial bearing plates 22 respectively. In the embodiment illustrated two separate bores 27 are formed at staggered and diametrically opposite points of the centre housing 15 to supply two separate annular reservoirs 28 arranged so that they are axially spaced with respect to the shaft 13 at points disposed at approximately the same distance from the transverse centre line of the enlarged portion 18 of the shaft, the bores and annular reservoirs being formed partially in the centre housing 15 and partially in the compressor and turbine volutes 8, 9. Thus from each annular reservoir 28 the feed channels 29, 30 lead to the ring channels 24, 26 in the cylindrical bearing sleeves 21 and in the end casings 16, 17 behind the end bearing plates 22 at each respective end of the enlarged portion 18 of the shaft. The pressure air supplied to the bores 27 and which may be taken from the same source as the throughput air of the machine, issues from the series of feed holes 23, 25 in the cylindrical bearing sleeves 21 and in the end bearing plates 22 in such manner that substantially even distribution of pressure results all round the enlarged portion 18 of the shaft and in particular the same pressure results on the bearing surface 20 at each end of such enlarged portion. To allow better distribution of the pressure air the inner ends of the feed holes 23, 25 are countersunk as shown.

The channel 21a between the inner ends of the sleeves 21 enables the bearing air from the cylindrical bearing portion 18a to be vented to atmosphere through an annular vent space 32, formed centrally in the centre housing 15, and escape ducts 33, the end bearing surfaces 20 being also vented by vent channels 34 leading therefrom to the vent space 32. Channels 35 are also formed in communication with the vent channels 34 along which the vented air is conducted to two vent spaces in the form of annular recesses 36 provided in the portions of the end casings 16, 17 disposed around the end portions 19 of the shaft 13 and arranged one around each of such end portions at a point inwardly of the compressor and turbine rotors 11, 12. By maintaining pressure air in the annular recesses 36 throughput air is prevented from passing over the backs of the compressor and turbine rotors 11, 12 and along the shaft 13 to mix with the bearing air and so interfere with the balance of pressures which is essential to the satisfactory operation of the bearing.

Instead of obtaining the pressure air for charging the bearing from the same source as the throughput air, such pressure air may be induced by the rotation of the machine. This may be achieved by making the end thrust faces of the end casings 16, 17 attached to the centre housing 15 of the machine, or the plate inserts 22 carried by the latter as already described, with volute grooves. As shown in Figure 2, such grooves may be in the form of a multi-start Archimedean spiral 37 extending across the central portion of the end plate 22, the grooves being, for example, between .0005" and .0015" deep so that air is drawn along the shaft 13 to maintain the charge of bearing air. Alternatively a multiplicity of arcuate inwardly extending slots 38 may be formed in the end plates 22, as shown in Figure 3, to induce pressure air to the bearing. It will be understood that the end plates at opposite ends of the machine are of opposite hand.

When the air-charging of the bearing is accomplished in this manner the vent channels may be dispensed with. Moreover the carbon or molybdenum disulphide-treated steel sleeve and end plates may be replaced by components of chromium plated steel in this embodiment.

If desired the end, or axial thrust, plates 22 may be arranged with underlying thrust plates 39, Figure 4, separated therefrom by a thin plate-like ball carrier 40, a similar ball carrier 41 being disposed between the underlying thrust plate and the recessed portion of the end bearing plate 16 of the machine in which the end and underlying thrust plates are received. Two balls 41a may be carried by each plate-like carrier so as to be disposed at 90° spacing from each other whereby a self-aligning axial thrust plate assembly is provided for the ends 20 of the enlarged central portion 18 of the shaft.

In the embodiment of the invention illustrated in Figure 5, the enlarged central portion of the shaft is given a diameter equal to that of the compressor and turbine rotors 11, 12 so that there is no shaft properly so-called but a hollow, rotating, substantially cylindrical body 42 with conical ends 43 formed by the curved sloping surfaces extending between the eyes 44, 45 of the compressor and turbine rotors 11, 12 and their peripheries. Advantage may be taken of this construction to provide fully shrouded compressor and turbine rotors and thereby substantially increase the efficiency of the machine while obviating the bearing difficulties which might otherwise arise from the use of fully shrouded rotors. This may be achieved by the provision of rotating annular shroud casings 46, 47 rigidly mounted with respect to the hollow impeller and expeller rotor body 42 by spiders 48 extending between the end bosses 49 of the rotors and the respective shroud casings 46, 47. The latter each comprises an annular element of box-like form in half-section having sides 50 which, adjacent the end walls of the hollow rotor body 42 are curved to the appropriate shroud form while, of the other sides of the substantially rectangular box-like section, one constitutes an extension 51 of the cylindrical surface 52 of the rotor body and forms a cylindrical bearing therefor while the remaining side 53 is annular and flat and disposed normal to said cylindrical bearing surface. These flat annular surfaces 53 constitute the end thrust surfaces of the rotating portion of the machine which are thus disposed outwardly beyond the rotors 11, 12 instead of therebetween as in the arrangement previously described.

The rotating portion of the machine last described is consequently of elongated cylindrical shape and pressure air is fed through feed holes 54 spaced angularly in a ring around cylindrical bearing plates 55 inserted into the compressor and turbine volutes 8, 9 and cooperating with the bearing surfaces 51 of the shroud casings 46, 47. Pressure air fed to inlet bores 56 disposed one at each end of the machine is conveyed to the feed holes 54 by ring channels 57 into which the outer ends of the feed holes open, their inner ends opening into further ring channels 58 formed centrally around the inner surface of the cylindrical bearing plates 55. Annular channels 59 formed in end plates 60 of the machine casing convey pressurised air to feed holes 61 formed at angularly spaced intervals in annular end bearing plates 62 inserted in the end plates, the inner ends of such feed holes opening into ring channels 63 in the end bearing plates to allow even distribution of the pressure air. Thus the complete cylindrical rotor comprising the central hollow impeller and expeller body 42 and the rotating annular shrouds 46, 47 at each end of the latter is provided with a bearing layer or envelope of air under pressure which is fed to the radial and end thrust bearing spaces in the manner already described.

If desired the inner peripheries of the shroud casings 46, 47 of the rotor may be provided with externally scolloped cylindrical axial extensions 64 where they run in the stationary eye portion 44, 45 of the casing of the machine to form labyrinths. Similar labyrinths are provided by forming scollops 65 on the cylindrical surfaces of the rotating shrouds 46, 47 and of the hollow compressor and turbine body 42 immediately adjacent and on each side of the openings 66 of the impeller and expeller to their respective volute casings. Consequently throughput air is prevented from passing along the cylindrical surfaces and mixing with the bearing air in the manner already described. The bearing air on the contrary passes between the flat annular bearing surfaces 53 of the shroud portions and the end bearing plates 62 of the machine, which constitute the end thrust bearings of the complete rotor, and is vented slowly to atmosphere along the labyrinth seals around the axial openings forming the eye portions 44, 45 in the end plates 60.

Figure 6 illustrates an alternative arrangement in which the portion of the shaft 13 between the compressor and turbine rotors 11, 12 is of constant diameter throughout its length, such diameter being small relatively to the diameter of the rotors. The centre housing 15 is formed by outer and inner portions 67, 68, the latter being in the form of a sleeve in which the shaft 13 revolves and having outwardly projecting radial flanges 69, 70, formed one towards each of its ends, each of which carries a self-aligning axial thrust plate assembly mounted on balls 71 disposed at 90° spacing from each other in the manner previously described. In this embodiment the end or axial thrust plates 22 are provided with arcuate grooves similar to those shown in Figure 3 to induce pressure air between the inner radial faces of the compressor and turbine rotors 11, 12 and the thrust plates and between the inner portion 68 of the central housing and the shaft 13. Each underlying thrust plate is in the form of a four-legged spider 72, Figure 7, each arm of which carries one of the mounting balls 71.

Recesses 73 are formed in two opposite arms of the spider 72 at the turbine end of the shaft 13 which mate with recesses or bores 74, formed in the flange 70 of the inner portion 68 of the centre housing, to form cylindrical chambers each of which contains a compression spring 75 which assists in retaining the balls 71 in position during assembly of the machine. Adjustment of the gaps between the inner radial faces of the compressor and turbine rotors 11, 12 and the grooved outer faces of the end thrust plates 22 is affected by suitably grinding one surface of a spacing washer 76 interposed between the compressor rotor and the shaft 13.

In the embodiment illustrated in Figure 8, as in the arrangement first described, the shaft 13 of the machine is made with a portion 18 of increased diameter between the compressor and turbine rotors 11, 12. The pressurised air for the bearings in the arrangement shown on the left side of the line A—A is induced by rotation of the shaft, air being drawn inwardly through the gap between the inner radial faces of the compressor and turbine rotors 11, 12 and the outer radial surface of the end casings 16, 17 of the central housing. Inward flow of the air is produced by arcuate grooves formed on the inner surfaces of the self-aligning end bearing plates 22, the inward flowing air passing from the peripheries of the compressor and turbine rotors 11, 12 through an annular channel 77 formed in each of the end casings 16, 17 to an annular space 78 at the rear of each rotor and thence along the shaft 13 and radially outwardly along the radial bearing surfaces 20 at each end of the enlarged portion 18 of the shaft to the cylindrical bearing surface 18a of the latter.

If it is desired to supply air under pressure to the shaft bearings, the centre housing 15 and enlarged portion 18 of the shaft may be modified as shown on the right side of the line A—A in Figure 8 and in Figure 9. Pressure air is fed through pipes secured in radially arranged bores 79 to channels 80 formed longitudinally in the centre housing 15, three of such bores and channels being arranged at equiangular spacing on each side of the centre housing. At their outer ends the longitudinal channels 80 open into ring channels 84 formed on the inner surfaces of the end casings 16, 17. Pressure air from the ring channels 84 passes inwardly along the radial bearing surfaces 20 and also along the cylindrical bearing surface 18a of the shaft. After passing inwardly along the latter the pressure air passes into circumferential grooves 83 formed on the enlarged portion 18 of the shaft and mating annular channels 83a in the bore of the centre housing 15 whence it is vented to atmosphere through three equiangularly spaced radial bores 85 formed in the latter and escape pipes 86 secured in such bores. In order to vent pressure air that has passed inwardly along the radial bearing faces 20 three equiangularly spaced longitudinal bores 82 are formed in the enlarged portion 18 of the shaft which communicate at their inner ends with radial bores 81 opening at their outer ends into the circumferential grooves 83.

Alternatively the flow of pressure air in the above arrangement can be reversed, pressure air being supplied through the pipes 86 and allowed to escape to atmosphere through the longitudinal channels 80 and radial bores 79.

I claim:

1. A bearing for a rotating element comprising in combination bearing means, a shaft rotatable relatively to said bearing means and carried thereby, said bearing means having axially spaced bearing portions extending in a radial sense with respect to the axis of rotation of said shaft and a further bearing portion of substantially cylindrical form coaxial with said axis of rotation and disposed between said axially spaced bearing portions, said shaft having spaced radial bearing surfaces and an intervening cylindrical bearing surface which correspond to and lie closely adjacent to said axially spaced bearing portions and said further bearing portion, and means for feeding under pressure a gaseous fluid medium between said spaced bearing portions and further bearing portion and said corresponding bearing surfaces of the shaft in order to provide gas-charged radial and end thrust bearings for the shaft.

2. A bearing for a rotating element according to claim 1, wherein said bearing portion of cylindrical form extends throughout the length between said spaced bearing portions whereby a substantially continuous gaseous bearing layer enclosing the spaced radial bearing surfaces and intervening bearing surfaces of the shaft is formed.

3. A bearing for a rotating element according to claim 1, wherein said further bearing portion of cylindrical form comprises a plurality of cylindrical bearing surfaces spaced axially along the shaft and disposed between said spaced bearing portions.

4. A bearing for a rotating element according to claim 1, wherein said further bearing portion of cylindrical form comprises a plurality of cylindrical bearing surfaces spaced axially along the shaft and disposed between said spaced bearing portions, one of said cylindrical bearing surfaces being arranged to lie substantially immediately adjacent one of said axially spaced bearing portions.

5. A bearing for a rotating element according to claim 1, and further comprising a machine of which the shaft forms a part, and means incorporated in said machine for inducing pressure in the said gaseous fluid medium to feed the bearing portions.

6. In a machine which handles gaseous fluid, the combination of a shaft and bearing means according to claim 1 and a rotor handling said gaseous fluid mounted at one end of said shaft, a vent space surrounding said shaft being formed in the machine immediately inward of said rotor to which space said bearing-charging gas is fed to prevent gas handled by said rotor passing along the shaft and interfering with the gas bearing arrangement.

7. A bearing for a rotating element according to claim 1, wherein said axially spaced bearing portions and said further bearing portions have wear-resistant surfaces in order to prevent damage to the bearings when starting from static conditions or during the stopping period of the shaft.

8. In a braked turbine, the combination of bearing means and a shaft according to claim 1, a free running coupled centrifugal air compressor and turbine, including a rotor for said compressor and a rotor for said turbine, said rotors both being mounted on opposite ends of said shaft, and vent spaces formed around the common rotor shaft at points immediately inward of the compressor and turbine rotors to which spaces bearing-charging gas is fed in order to prevent throughput air passing from either the compressor or the turbine rotor along the shaft and interfering with the gas bearing arrangements.

9. A bearing for a rotating element according to claim 1, wherein said means for feeding gaseous fluid medium under pressure comprise slots formed in radial faces of said spaced bearing portions adjacent the corresponding bearing surfaces of the shaft.

10. A bearing for a rotating element according to claim 1, and further comprising a central housing forming said cylindrical bearing portion and flat annular bearing elements disposed one towards each end of said centre housing and rigidly carried thereby which form said spaced bearing portions.

11. A bearing for a rotating element according to claim 1, wherein said shaft is provided with a portion of increased diameter between its ends so that a central cylindrical bearing surface is formed which cooperates with said further bearing portion, bearing surfaces which extend in a radial sense with respect to the axis of the shaft being provided by each end of said portion of increased diameter of the shaft which cooperate one with each of said axially spaced bearing portions.

References Cited in the file of this patent

UNITED STATES PATENTS

| | | |
|---|---|---|
| 2,646,210 | Kohlmann | July 21, 1953 |
| 2,668,006 | Larrecq | Feb. 2, 1954 |
| 2,670,146 | Heizer | Feb. 23, 1954 |
| 2,671,700 | Seyffert | Mar. 9, 1954 |
| 2,696,410 | Topanelian | Dec. 7, 1954 |